United States Patent
Sudik et al.

(10) Patent No.: US 9,502,718 B2
(45) Date of Patent: *Nov. 22, 2016

(54) METAL OXYGEN BATTERY CONTAINING OXYGEN STORAGE MATERIALS

(71) Applicant: Ford Global Technologies, LLC, Dearborn, MI (US)

(72) Inventors: Andrea Sudik, Canton, MI (US); Andrew Robert Drews, Ann Arbor, MI (US); Jun Yang, Bloomfield, MI (US); Shinichi Hirano, West Bloomfield, MI (US); Michael Alan Tamor, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,580

(22) Filed: Sep. 3, 2015

(65) Prior Publication Data

US 2015/0380743 A1  Dec. 31, 2015

Related U.S. Application Data

(62) Division of application No. 12/828,392, filed on Jul. 1, 2010, now Pat. No. 9,147,920.

(51) Int. Cl.
| | |
|---|---|
| *H01M 4/90* | (2006.01) |
| *H01M 8/10* | (2016.01) |
| *H01M 12/06* | (2006.01) |
| *H01M 12/08* | (2006.01) |

(52) U.S. Cl.
CPC ......... *H01M 4/9008* (2013.01); *H01M 4/9016* (2013.01); *H01M 8/1004* (2013.01); *H01M 12/06* (2013.01); *H01M 12/08* (2013.01); *H01M 2250/20* (2013.01); *H01M 2300/0068* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 4,105,830 | A | 8/1978 | Kordesch |
| 4,369,235 | A | 1/1983 | Bursell |
| 4,482,618 | A | 11/1984 | Orsino et al. |
| 4,762,978 | A | 8/1988 | Tanis |
| 6,238,821 | B1 | 5/2001 | Mukherjee et al. |
| 6,280,871 | B1 | 8/2001 | Tosco et al. |

(Continued)

FOREIGN PATENT DOCUMENTS

| | | |
|---|---|---|
| JP | 2006221993 A | 8/2006 |
| JP | 2009230985 A | 10/2009 |

(Continued)

OTHER PUBLICATIONS

C. Combelles et al., Structural, Magnetic and Redox Properties of a New Cathode Material for Li-ion Batteries; The Iron-based Metal Organic Framework, Ionics, Abstract, vol. 14, No. 4, Jul. 2008, pp. 279-283.

(Continued)

*Primary Examiner* — Gregg Cantelmo
(74) *Attorney, Agent, or Firm* — Damian Porcari Brooks Kushman P.C.

(57) ABSTRACT

A method of storing oxygen in a cathode including an oxygen storage metal-organic framework ("MOF") material comprising a mixture of ionic conductive material, electron conductive material and catalyst material within the MOF.

20 Claims, 5 Drawing Sheets

(56) References Cited

U.S. PATENT DOCUMENTS

| | | |
|---|---|---|
| 6,372,370 B1 | 4/2002 | Kaplan et al. |
| 6,599,655 B2 | 7/2003 | Johnson et al. |
| 7,070,882 B1 | 7/2006 | Ferrando |
| 7,147,967 B1 | 12/2006 | Read |
| 7,198,867 B2 | 4/2007 | Sanders |
| 7,309,380 B2 | 12/2007 | Muller et al. |
| 7,481,866 B2 | 1/2009 | MacGillivray et al. |
| 7,517,396 B2 | 4/2009 | Arnold et al. |
| 7,553,352 B2 | 6/2009 | Mueller et al. |
| 7,652,132 B2 | 1/2010 | Yagi et al. |
| 2003/0075643 A1 | 4/2003 | Dunn |
| 2003/0099884 A1 | 5/2003 | Chiang et al. |
| 2003/0170516 A1 | 9/2003 | Prerad |
| 2004/0225134 A1 | 11/2004 | Yaghi et al. |
| 2005/0287421 A1 | 12/2005 | Simon et al. |
| 2006/0127764 A1 | 6/2006 | Chen et al. |
| 2007/0141431 A1 | 6/2007 | Wang et al. |
| 2007/0172739 A1 | 7/2007 | Visco et al. |
| 2008/0299456 A1 | 12/2008 | Shiga et al. |
| 2009/0123811 A1 | 5/2009 | Baumann et al. |
| 2009/0131643 A1 | 5/2009 | Ni et al. |
| 2009/0239132 A1 | 9/2009 | Johnson |
| 2009/0246601 A1 | 10/2009 | Iwata et al. |
| 2009/0261107 A1 | 10/2009 | Allgeuer et al. |
| 2010/0151336 A1 | 6/2010 | Nakanishi |
| 2010/0186588 A1 | 7/2010 | Yaghi et al. |
| 2011/0104576 A1 | 5/2011 | Johnson et al. |

FOREIGN PATENT DOCUMENTS

| | | |
|---|---|---|
| WO | 99/60654 A1 | 11/1999 |
| WO | 2007074098 A1 | 5/2007 |
| WO | 2008136296 A1 | 11/2008 |
| WO | 2009133366 A2 | 11/2009 |

OTHER PUBLICATIONS

M. Mirzaeian et al., Preparation of Controlled Porosity Carbon Aerogels for Energy Storage in Rechargeable Lithium Oxygen Batteries, Electrochimica Acta 54, (2009), pp. 7444-7451.

Ma, Shengqian et al., A Metal-Organic Framework With Entatic Metal Centers Exhibiting High Gas Adsorption Affinity, J. Am. Chem. Soc., 128, 2006, pp. 11734-11735.

METAL OXYGEN BATTERY CONTAINING OXYGEN STORAGE MATERIALS

CROSS-REFERENCE TO RELATED APPLICATIONS

This application is a divisional of U.S. application Ser. No. 12/828,392 filed Jul. 1, 2010, now U.S. Pat. No. 9,147,920 issued Sep. 29, 2015.

TECHNICAL FIELD

One or more embodiments of the present invention relate to oxygen storage materials as a source of oxygen for metal oxygen batteries and their method of use.

BACKGROUND

There are many power storage and generation devices for vehicles. For instance, a fuel cell is a thermodynamically open system in which a fuel, such as hydrogen, irreversibly reacts with an oxidant, such as oxygen, to form water and electrical energy. By contrast, a battery is an electrochemical device that is often formed of a number of separate electrochemical battery cells interconnected to a single set of terminals providing an electrical output.

SUMMARY

In one embodiment, a method is disclosed in which oxygen is stored in a cathode including an oxygen storage metal-organic framework ("MOF") material comprising a mixture of ionic conductive material, electron conductive material and catalyst material within the MOF.

In another embodiment, a method is disclosed in which oxygen is released from a cathode including an oxygen storage metal-organic framework ("MOF") material comprising a mixture of ionic conductive material, electron conductive material and catalyst material within the MOF.

In yet another embodiment, a method is disclosed in which oxygen is stored in a cathode including an oxygen storage metal-organic framework ("MOF") material comprising a mixture of ionic conductive material, electron conductive material and a composition of M'@MOF, where M' is a catalyst material and includes one or more metal-containing molecules and MOF is a metal organic framework

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Reference will now be made in detail to embodiments of compositions, structures, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

There are many power storage and generation devices for vehicles. For instance, a fuel cell is a thermodynamically open system in which a fuel, such as hydrogen, irreversibly reacts with an oxidant, such as oxygen, to form water and electrical energy. By contrast, a battery is an electrochemical device that is often formed of a number of separate electrochemical battery cells interconnected to a single set of terminals providing an electrical output.

Figure 1:
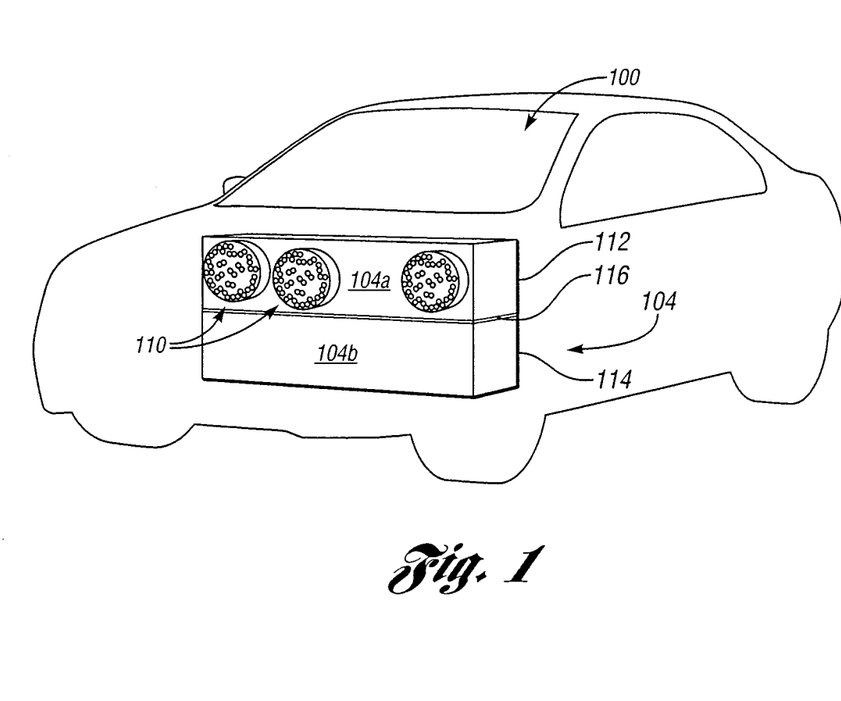
FIG. 1 depicts an illustrative view of a battery system for use in a vehicle according to one embodiment.

In one or more embodiments, the MOB 104 is substantially free of water molecules and particularly liquid water molecules.

In one or more embodiments, the term "substantially free" refers to an extent of being less than 1000 parts per million (ppm), less than 500 ppm, less than 200 ppm, less than 100 ppm, or less than 50 ppm. In some instances means that a substance, such as water, is not purposefully added and whose presence, if any, is only incidental.

In yet another embodiment, the oxygen containment unit 102 includes relatively pure oxygen species in that any other gas or fluid species, such as nitrogen ($N_2$), is not present or only incidentally present at a nominal amount. This is in direct contrast to atmospheric air wherein nitrogen has a relatively significant presence relative to oxygen. In certain instances, when incidentally present, nitrogen is less than 1000 ppm, less than 500 ppm, less than 100 ppm, or less than 50 ppm.

As stated herein, one of the advantages of the present invention, in one or more embodiments, is that oxygen can be stored in the oxygen storage material 110 with a relatively high concentration and/or density as unusable or interfering gas molecules such as nitrogen can be effectively avoided. As a result, an oxygen material flow communicating between the MOB 104 and the OSM 110 can be effectively in a relatively how flow rate, which further reduces system costs associated with effecting and maintaining otherwise relatively high flow rate operations.

Electrochemical battery cells can include numerous configurations and chemistries, including primary or non-rechargeable battery cells and secondary or rechargeable battery cells. Non-limiting examples of a secondary battery cell include a lithium ion cell, a metal hydride cell, a metal-air battery cell, and a metal-oxygen battery cell. In general, a secondary battery cell is capable of storing electrical energy chemically, and the chemical storage often involves a reversible redox reaction. In the uncharged state, the redox reaction does not start spontaneously, and, in such cases, the secondary battery cell needs to be charged initially in order to store energy.

In one example of a secondary battery cell, a lithium ion cell includes a layered oxide positive electrode including lithium in ionic communication with a graphite negative electrode through a non-aqueous electrolyte and a separator. During charging, lithium is ionized from the layered oxide positive electrode and migrates through the electrolyte and separator to the negative electrode and becomes embedded in the porous negative electrode composition by the process of intercalation. During a discharge half step, the intercalation composition decomposes allowing current to flow within the battery cell by the movement of lithium ions from the negative electrode to the positive electrode.

In another example of a secondary battery cell, the metal hydride battery cell includes a metal oxyhydroxide positive electrode, such as a nickel oxyhydroxide, electrically communicating with a metal alloy negative electrode. The metal alloy negative electrode is a hydrogen storage alloy negative electrode. The hydrogen storage alloy includes a material reversibly forming a mixture of metal hydride compounds. In certain instances, the hydrogen storage alloy includes an intermetallic material having two or more solid phase metallic elements.

In yet another example of a secondary battery cell, a metal air battery cell is, in typical configurations, an open system with respect to material flow, heat transfer, and work. For instance, a metal air battery cell is provided with holes, openings, or vents, which mediate air transport between the metal air battery and atmospheric air. For most metal air batteries, moisture and interfering gases from the air often need to be filtered, eliminated, or trapped prior to the air's being introduced to the metal air battery. For instance, the metal air battery cell includes an air positive electrode electrically communicating with a metal negative electrode through an electrolyte and a separator. The air positive electrode, in typical configurations, includes a carbon composition positive electrode. During the charge reaction, oxygen is released to the ambient air.

Metal oxygen batteries (MOBs) are conventionally characterized as a subgroup of the metal air batteries as oxygen is commonly involved for the electrochemical reactions. MOBs are known to have relatively high electrochemical capacities, and are therefore of great interest for applications where the total mass of a given battery is limited. Implementation of conventional MOBs has been met with difficulties in that their performance, both in terms of capacity and power, has been largely unsatisfactory. The limited performance is believed to be at least in part associated with incomplete or slow reactions involving the arrival and diffusion of oxygen molecules. For an MOB to achieve its full discharge capacity, sufficient quantities of oxygen must be made available in a timely manner. In addition, since the rate of discharging is tied to the formation and growth of the positive electrode oxide, the battery's rate of discharging at least in part depends on the more rate limiting processes of oxygen diffusion.

In one or more embodiments, the term metal oxygen battery (MOB) refers to a battery structure that differs from conventional metal oxygen/air batteries at least in that the MOB is relatively closed to atmospheric air and oxygen for reactions is relatively devoid of unwanted species such as nitrogen or carbon dioxide.

In one or more embodiments, the term "electrode" may refer to a structure through which charges are carried by electromotive force. Electrodes may be composed of one or more metal and/or semiconductor. Electrodes may be solid or liquid.

In one or more embodiments, the term "electrolyte" refers to a material and/or structure through which charges are carried by the movement of ions. Electrolytes may be any phase on the continuum of liquid to solid, including polymer gels, pastes, fused salts, ionic liquids, organic carbonates, or ionically conducting solids, such as sodium $\beta$-alumina, which has mobile sodium ions.

In one or more embodiments, metal-oxygen batteries (MOBs) may refer to a class of electrochemical cells in which, during discharging, oxygen is reduced at a positive electrode surface as part of the electrochemical cell reaction. Reduction of the oxygen forms an oxide or peroxide ion which reacts with a cationic metal species. Metal-oxygen batteries may be based upon Fe, Zn, Al, Mg, Ca, and Li.

MOBs, such as $Li^+$ based MOBs, have recently been demonstrated experimentally in a small number of laboratories. However, implementation of conventional MOBs has been largely unsuccessful because their performance, both in terms of capacity and power, has been unsatisfactory for vehicle applications. The limited performance is believed to be likely associated with incomplete or slow reactions involving the arrival and dissociation of oxygen molecules from the atmospheric air. In particular, for a metal oxygen battery to achieve its full discharge capacity, sufficient quantities of oxygen should be made available in a timely manner. In addition, since the rate of discharge is tied to the formation and growth of the cathode oxide, the battery's rate of discharge depends in part on the more rate limiting processes of oxygen dissociation.

It has been found, according to one or more embodiments of the present invention, that the MOB performance can be greatly improved by one or more of the following approaches: (1) providing a relatively high concentration of oxygen at the positive electrode; and/or (2) increasing oxygen diffusion rate at the positive electrode.

One or more of the following benefits can be realized according to certain embodiments of the present invention: (1) requirements for many balance of plant (BOP) components including positive electrode flow field, blower, and air purification system, can be reduced or eliminated; (2) susceptibility to contamination from atmospheric air impurities can be reduced or eliminated; (3) battery system flexibility may be increased and packaging costs can be reduced; (4) battery cell manufacturing procedures may be simplified; and/or (5) improved battery performance kinetics may be realized via a reduction in bulk diffusion and an increase in surface diffusion.

According to one aspect of the present invention, a battery system is provided. In one embodiment, and as depicted in FIG. 1, a battery system generally shown at 100 includes a metal oxygen battery 104 having a first electrode 104a and a second electrode 104b, the second electrode 104b including a metal material M (not shown). An oxygen storage material 110 is disposed within the metal oxygen battery 104. In certain instances, the metal oxygen battery 104 further includes a separator 116 defining a first electrode compartment 112 including the first electrode 104a and a second electrode compartment 114 including the second electrode 104b. In this configuration, the oxygen storage material 110 is disposed within the first electrode compartment 112 and communicates oxygen 108 to and from the first electrode 104a.

In certain instances, the oxygen storage material 110 is in fluid communication with the metal oxygen battery 104, and in certain particular instances the fluid is oxygen.

In one or more embodiments, the metal material M includes one or more elemental metal listed in the periodic table and/or one or more alloys formed of a mixture of two or more of the elemental metals. A non-limiting list of the elemental metals includes alkali metals, alkaline earth metals, transition metals and post-transition metals.

In certain instances such as during discharging, the first electrode 104a functions as a positive electrode or a cathode, and the second electrode 104b functions as a negative electrode or an anode. In certain other instances such as during charging, the first electrode 104a may function as a negative electrode or an anode, and the second electrode 104b may function as a positive electrode or a cathode. In these instances, the term "positive electrode" refers to an electrode with a positive polarity, and the term "negative electrode" refers to an electrode with a negative polarity.

Figure 2:
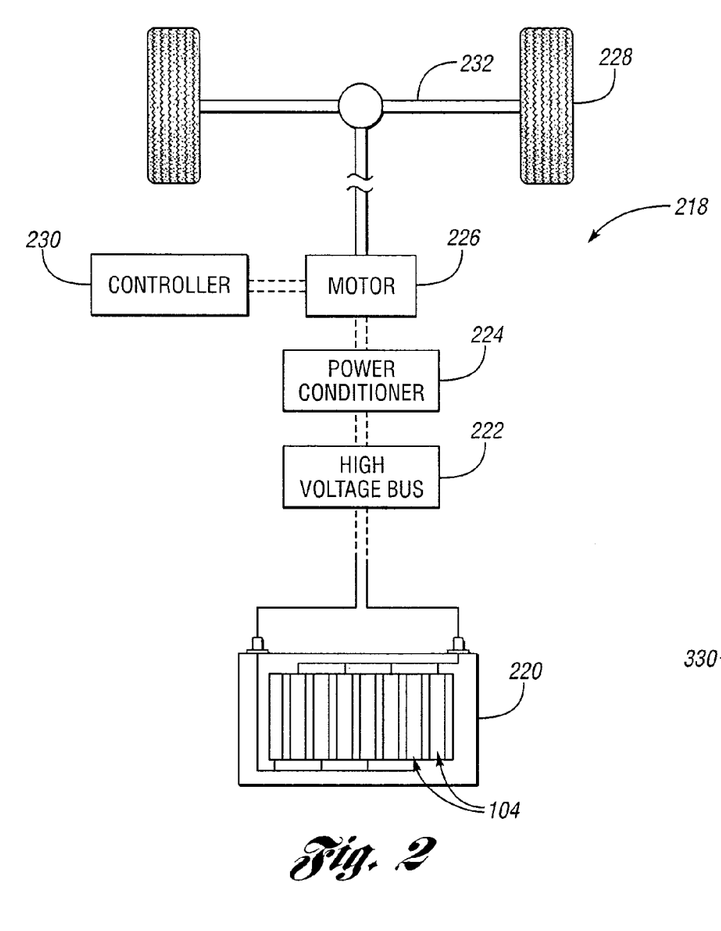
FIG. 2 illustrates a top view of an electric vehicle including a metal oxygen battery or a metal oxygen battery system according to another embodiment of the present invention.

FIG. 2 illustrates a top view of an electric vehicle including a metal oxygen battery or a metal oxygen battery system according to another embodiment of the present invention. As illustratively depicted in FIG. 2, connected to vehicle 218 is a metal oxygen battery (MOB) system 220 electrically communicating directly or indirectly with a controller 230. The controller 130 electrically communicates with a traction motor 226. Traction motor 226 is connected to at least one wheel 228 of the vehicle 218. In certain instances, MOB battery system 220 electrically communicates with and provides energy to a high-voltage bus 222. High-voltage bus 222 electrically communicates with and provides energy to a power conditioner 224. The power conditioner 224 electrically communicates with the traction motor 226 which is connected directly or indirectly to wheel 228 situated on a frame 232.

Figure 3:
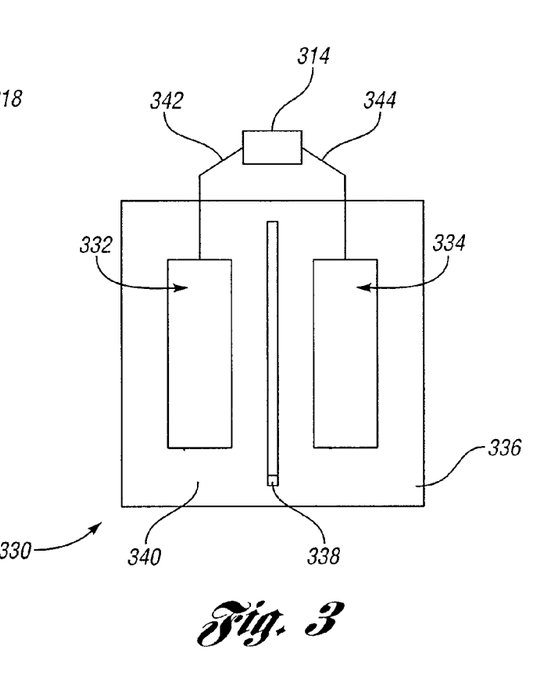
FIG. 3 schematically illustrates in cross-sectional view a battery cell according to at least one embodiment.

Turning now to FIG. 3, a battery cell 330 is schematically illustrated in cross-sectional view according to at least one embodiment. A first electrode 332 electrically communicates with a second electrode 334. The first electrode 332 and second electrode 334 are situated in a housing 336. Housing 336 defines a closed container allowing no transfer of material, oxygen in particular, to and from the ambient environment, but allows heat and work to be transferred.

A separator 338 may be situated between the first electrode 332 and the second electrode 334. In this configuration, the first electrode 332, the second electrode 334, and the separator 338 are contained within the housing 336 and are at least partially in contact with an electrolyte 340. In certain particular instances, the electrolyte 340 is non-aqueous.

Conduit 342 extends from housing 336 and electrically communicates with first electrode 332. Conduit 344 also extends from housing 336 and electrically communicates with electrode 334. Conduits 342 and 344 electrically communicate with high voltage bus 222 to allow electrons to flow between the first electrode 332 and second electrode 334 when the circuit 314 is in a closed operating state.

Figure 5A:
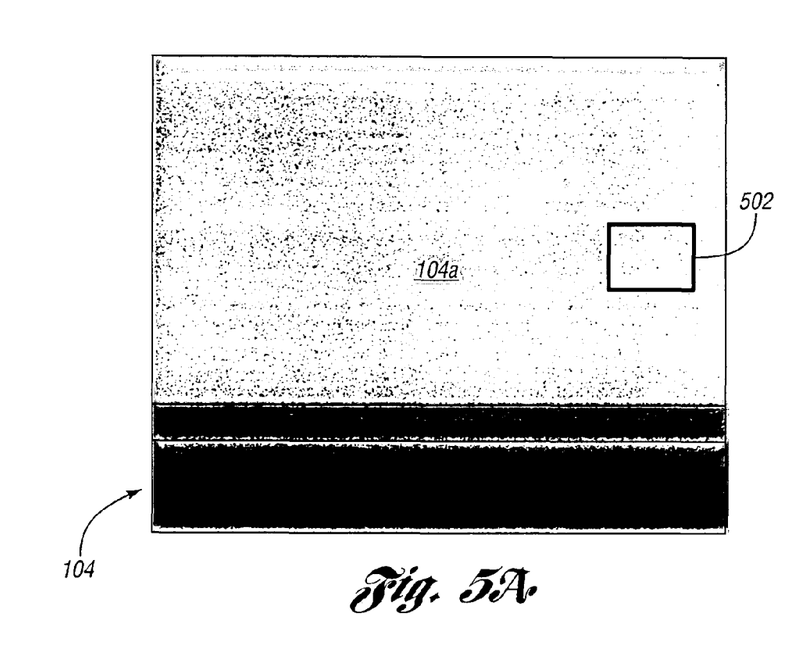
FIG. 5A to 5C schematically illustrate embodiments of the multifunctional electrode formed of oxygen storage material.
Figure 5B:
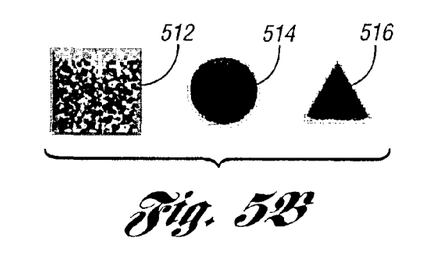
Figure 5C:
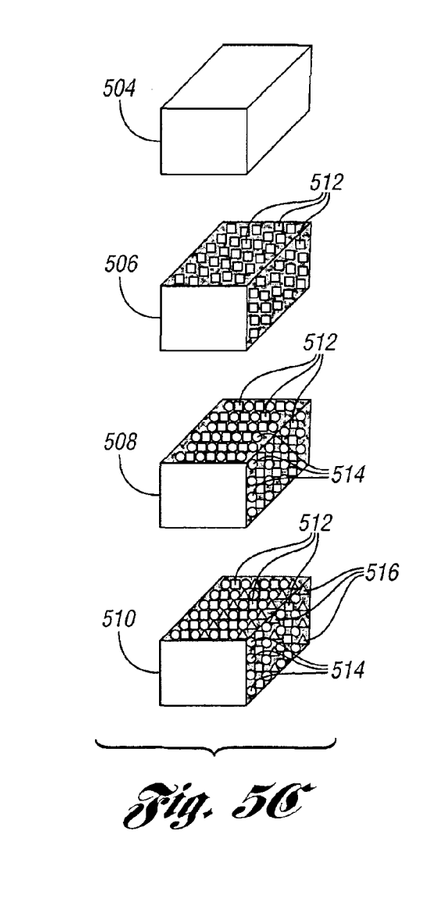

In yet another embodiment, an enlarged view 504, 506, 508, 510 of a section 502 of the first electrode 104a is depicted in FIGS. 5A to 5C. As illustrated by the enlarged view 504, at least a portion of the first electrode 104a may be formed of OSM that has all the following functions: particular porosity for oxygen storage, particular catalytic capacity, particular ion conductivity, and particular electron conductivity. As illustrated by the enlarged view 506, at least a portion of the first electrode 104a may be formed of OSM deficient of one or more of the above-categorized functions, and supplemented, for instance, with an ion conductive material 512. As illustrated by the enlarged view 508, at least a portion of the first electrode 104a may be formed of OSM deficient of one or more of the above-categorized functions, and supplemented, for instance, with an electron conductive material 514. As illustrated by the enlarged view 510, at least a portion of the first electrode 104a may be formed of OSM deficient of one or more of the above-categorized functions, and supplemented, for instance, with a catalytic material 516.

An operating state, in at least one embodiment, includes a discharging operating state, in which oxidation occurs at the second electrode producing electrons. A non-limiting example of a half-cell reaction at the second electrode during discharging operating state is shown in [1]

$$Li \rightarrow Li^+ + e^- \qquad [1]$$

where the Li metal is included in the second electrode and the Li cation migrates through the electrolyte to the first electrode. At the first electrode, the Li cation reacts with oxygen to form the mixed oxide metal oxide as shown in [2]

$$Li^+ + xO_2 + 2x\ e^- \rightarrow LiOx \qquad [2]$$

where the electrons generated at the second electrode in [1] flow to the first electrode through a load circuit, such as high voltage bus 14; and where LiOx may be the mixed oxide metal oxide which may include stoichiometric metal oxides such as $Li_2O_2$, a lithium peroxide and $Li_2O$, a lithium oxide. It is appreciated that non-stoichiometric metal oxides may be intermixed with the stoichiometric metal oxides or comprise the entire mixed oxide metal oxide, especially after at least greater than 10 charging-discharging cycles have occurred. A non-limiting example of the non-stoichiometric metal oxide may include a dendritic mixed oxide metal oxide solid that forms at the second electrode. While not wishing to be tied to any one theory, the formation of such irregular mixed oxide metal oxide solids, such as the dendritic mixed oxide metal oxide may be one cause of the long-term degradation of the effectiveness of being able to recharge the MOB.

Without being limited to any particular theory, it is believed that oxygen storage material as disposed within a metal oxygen battery does not lose surface area or deactivate to any significant degrees, under the normal operating conditions for the metal oxygen battery. In certain instances, at least 70 percent, 80 percent, 90 percent, or 98 percent by weight of the oxygen storage material remain thermally stable and electrochemically active after 3 months of usage.

At the second electrode during the charging operating state, following the above embodiment and non-limiting example, reduction occurs as the lithium cation is reduced to lithium metal at the second electrode. The exemplary half-cell reaction is shown in [3]

$$Li^+ + e^- \rightarrow Li \qquad [3]$$

At the first electrode during the charging operating state, oxidation occurs, producing electrons and decomposing the mixed oxide metal oxide solid to release oxygen. A non-limiting example of a half-cell reaction at the first electrode during the charging operating state is shown in [4]

$$LiOx \rightarrow Li^+ + \frac{x}{2}O_2 + e^- \quad [4]$$

The oxygen is stored in an oxygen containment unit including the OSM when the oxygen is contained by physiosorption intercalation, and/or clathratization. The OSM may be situated in an external storage device, permitting isolation of the OSM from the first electrode; adjacent to the first electrode; and/or in intimate contact with the first electrode, which substantially minimizes the diffusion distance for the oxygen until reaction with the first electrode occurs during the discharging operating state. Reducing the diffusion distance increases the responsiveness to electron flow rates as the demand on the load circuit, e.g. directly or indirectly the demand of the traction motor, changes during operation time periods of the vehicle.

In at least one embodiment, the average diffusion distance from the point of the OSM where oxygen is released to the point at or near the first electrode where the oxygen is reacted to is from 1 nm to 5 cm, 1 nm to 1 cm, or 1 nm, to 0.1 cm.

In one or more embodiments, the metal-oxygen battery cell is a closed-loop system with respect to material flow, but not to heat transfer or work. For instance, the metal-oxygen battery cell includes an oxygen positive electrode electrically communicating with a metal negative electrode through an electrolyte and a separator. The oxygen positive electrode includes an oxygen storage material which stores oxygen by the process of physiosorption, including adsorption, intercalation and clathratization processes. It should be appreciated that the oxygen positive electrode may further include a structural component in addition to the oxygen storage material, such as a carbon material. It is appreciated that the metal-oxygen battery positive electrode may further include a catalytic component, such as $Fe_2O_3$ and/or $Co_3O_4$; an ion conductive component, such as polyacrylonitrile and/or polyethylene oxide; and/or an electron conductive component including a conductive aid, such as amorphous carbon, graphitic carbon, graphene, and/or carbon nanotubes.

In one or more embodiments, the metal-oxygen battery cell undergoes reversible redox reactions. During the discharging reaction, the oxygen reacts with a metal cation from the metal negative electrode, forming a mixed oxide metal oxide, including a metal oxide and/or a metal peroxide which is then situated at the positive electrode. During the charging reaction, the metal mixed oxide metal oxide decomposes, releasing oxygen which, in at least one embodiment, is stored in a metal oxygen framework (MOF) composition at the positive electrode. The metal cation migrates back to the negative electrode reacquiring an electron from the negative electrode and forming a metal composition.

Oxygen storage materials (OSMs) may be utilized for oxygen by providing appreciable surface area for enhancing oxygen uptake. Desirable on-board operating conditions illustratively include near ambient temperature (T) (e.g., 150 K to 400 K) and modest pressure (P) (e.g., 1 to 100 bar) to avoid added cost or system complexity. Particularly suitable binding energies for oxygen material storage may be determined based on the Clausius-Claeypron Equation of the form:

$$lnP = \frac{-\Delta H}{R}\frac{1}{T}$$

where P is the partial pressure of oxygen, ΔH is the sorbent oxygen binding energy, R is a constant, and T is the temperature in degrees Kelvin of the oxygen. In certain other instances, the OSM has an oxygen binding energy, or particularly an isosteric adsorption enthalpy, ranging from 5 kJ/mol.$O_2$ to 100 kJ/mol.$O_2$, or 7 kJ/mol.$O_2$ to 70 kJ/mol.$O_2$, or to 10 kJ/mol.$O_2$ to 40 kJ/mol.$O_2$.

In one or more embodiments, OSMs may be utilized as oxygen storage materials for oxygen in terms of having relatively high material density. The volumetric storage capacity of an OSM may be related to the gravimetric capacity and material density for the OSM. As a non-limiting example, if a given OSM has a gravimetric capacity of 0.3 kg of oxygen per kg and a materials density of 0.2 g/mL, a corresponding volumetric capacity would be 60 g of oxygen per liter of OSM. Storing 8 kg of oxygen would use 133 liters of OSM. However, if the material density is 1 g/mL, only 27 liters of OSM would be required.

Without being limited to any particular theory, it is appreciated that the OSMs are generally provided with a relatively high-surface area, which facilitates oxygen uptake or adsorption by processes such as physiosorption. Such oxygen uptake scales linearly with surface area as measured using any suitable method such as the BET method. In certain instances, the surface area of the OSM exceeds 1000 m$^2$/g, from 2000 m$^2$/g to 8000 m$^2$/g, or from 3000 m$^2$/g to 6000 m$^2$/g.

In one or more embodiments, it is appreciated that oxygen molecules as described herein may include oxygen species other than oxygen, such as diatomic oxygen, ozone, and free radical oxygen species.

In certain instances, the OSM in the excess capacity has a gravimetric capacity for oxygen of greater than 10 grams per 100 grams of the OSM, or of between 20 to 80 grams per 100 grams of the OSM, or 25 to 50 grams oxygen per 100 grams of the OSM.

In certain other instances, the OSM has a material (single crystal) density greater than 0.1 g/mL, or of from 0.25 g/mL to 5 g/mL, or of from 0.5 g/mL to 2 g/mL.

In certain other instances, the OSM has a volumetric capacity for oxygen of greater than 2 g/L, or of from 16 g/L to 500 g/L, of or 32 g/L of to 300 g/L, or of from 50 g/L to 220 g/L.

In one or more embodiments to achieve one or more of the properties discussed above, the OSMs are porous, high surface area sorbent materials. Non-limiting examples of the OSMs include crystalline framework-like compounds such as metal-organic frameworks (MOFs), covalent organic frameworks (COFs), zeolitic imidazolate frameworks (ZIFs) and zeolitic materials; aerogel-like substances with nanometer or micrometer scale porosity, such as zero-gels and xero-gels; porous carbon materials such as porous carbon gels, porous carbon nanotubes, and porous metal substances such as porous metal oxides, porous metal carbides, porous metal nitride or other porous metal substances with internal sites that favorably form weak physical adsorption sites with oxygen.

Non-Limiting Examples of the MOFs Include:
a catalytically-active MOF-5 having embedded metal, such as Ag@[$Zn_4O(BDC)_3$], Pt@[$Zn_4O(BDC)_3$], Cu@[$Zn_4O(BDC)_3$], and Pd@[$Zn_4O(BDC)_3$]; an organically solvated MOF, such as $Ti(O^iPR)_4[Cd_3Cl_6(LI)_3]\cdot 4DMF\cdot 6MeOH\cdot 3H_2O$, $Ti(O^iPR)_4[Cd_3(NO_3)_6(LI)_4]\cdot 7MeOH\cdot 5H_2O$, $Ti(O^iPr_4[Cd(LI)_2(H_2O)_2][ClO_4]_2\cdot DMF\cdot 4MeOH\cdot 3H_2O$, [$Rh_2(M^{2+} TCPP)_2$], where $M^{2+}$ may include Cu, Ni, or Pd, and [$Zn_2(BPDC)_2(L2)$]·10DMF·8$H_2O$; an ionically or partially ionically solvated MOF, such as [Ni(L-aspartate)bpy$_{0.5}$] HCl$_{0.9}$MeOH$_{0.5}$, [Cu(L-aspartate)bpy$_{0.5}$] HCl,[Cu(D-aspartate)bpy$_{0.5}$] HCl, [Cu(L-aspartate)bpy$_{0.5}$] HCl,[Cu(D-aspartate)bpy$_{0.5}$] HCl, $Cr_3(F,OH)(en)_2O(BDC)_3$(ED-MIL-101), $Cr_3(F,OH)(en)_2O(BDC)_3$(ED-MIL-101), [$Zn_3O(L3-H)$]·($H_3O)_2(H_2O)_{12}$(D-POST-1), [$Sm(L4-H_2)(L4-H_3)(H_2O)_4$]·($H_2O)_x$, [Cu(bpy)($H_2O)_2(BF_4$)(bpy)], [$Zn_4O(BDC)_3$](MOF-5), [$Ln(OH)H_2O$(naphthalenedisulfonate)] where Ln includes a lanthanide metal such as Nd, Pr, or La; as well as [$In_4(OH)_6(BDC)_3$], [$Cu_3(BTC)_2$], [$Sc_2(BDC)_3$], [$Sc_2(BDC)_{2.5}(OH)$], [$Y_2(BDC)_3(H_2O)_2$]·$H_2O$, [$La_2(BDC)_3(H_2O)_2$]·$H_2O$, [Pd(2-pymo)$_2$], [$Rh_2(H_2TCPP)_2$]$BF_4$, [$Cu_2$(trans-1,4 cyclohexanedicarboxy-late)$_2$]$H_2O$,[Cu(2-pymo)$_2$], [Co(PhIM)$_2$], [$In_2(BDC)_3$(bpy)$_2$], [$In_2(BDC)_2(OH)_2$(phen)$_2$], [In(BTC)($H_2O$) (bpy)], [In(BTC)($H_2O$)(phen)], [$Sc_2(BDC)_{2.5}(OH)$], [$Y_2(BDC)_3(H_2O)_2$]·$H_2O$, [$La_2(BDC)_3(H_2O)_2$]$H_2O$, [$Cu_3(BTC)_2$], [Cd(4,4'-bpy)$_2(H_2O)_2$]—(NO$_3$)$_2$·($H_2O)_4$, [Sm(L4-H$_2$)(L4-H$_3$)(H$_2$O)$_4$]·(H$_2$O)$_x$, $Mn_3[(Mn_4Cl)(BTT)_8(MeOH)_{10}]_2$, [$Zn_4O(BDC)_3$](MOF-5), Ti-(2,7-dihydroxynaphthalene)-MOF, [Pd(2-pymo)$_2$], [$Cu_3(BTC)_2$], [$Cu_3(BTC)_2$], [$Cu_3(BTC)_2$], [$Rh_2(L5)$], [Rh(BDC)], [Rh(fumarate)], [Ru(1,4-diisocyanobenzene)$_2$]Cl$_2$, [$In_4(OH)_6(BDC)_3$],[$Ru_2(BDC)_2$], [$Ru_2(BPDC)_2$], [$Ru_2(BDC)_2$(dabco)],[$Ru_2(BPDC)_2$(dabco)],[$Rh_2$(fumarate)$_2$], [$Rh_2BDC)_2$], [$Rh_2(H_2TCPP)_2$], and [Pd(2-pymo)$_2$].

In certain instances, the MOF has a general composition of M@MOF gas-phase deposited nanoparticles, such as Pt@ [$Zn_4O$ (BDC)$_3$]. The M'@MOF gas-phase deposited nanoparticles may have an average maximum dimension ranging from 0.5 nm to 5 nm, or 0.75 nm to 3.5 nm, when fresh. In at least one embodiment, M' includes one or more polynuclear metal clusters and/or any metal-containing molecule such as $Fe_2O_3$, $Co_3O_4$, or mixtures of metal-containing molecules. Therefore, M' can additionally serve as one or more catalytic components for catalyzing the reactions within the metal oxygen battery.

In at least one embodiment, the M' content of the M'@MOF material ranges from 5 percent to 35 percent by weight, or 20 percent to 30 percent by weight, of the M'@MOF material.

In at least one embodiment, the electron conductive component includes a post-synthesized substituent, such as a pendant chain having an electron conductive functional group, such as an acrylonitrile group or a cyano-group. In another embodiment, the electron conductive component includes a conductive polymeric molecule, having the electron functional group in the polymeric chain prior to binding with the metal atom forming the MOF. In certain instances, one or more of these electron conductive components may be coupled to the MOF molecules as linker or a pendant groups to confer electron conductive functions to the MOF-based electrode.

In certain particular instances, the electron conductive component has a conductivity ranging from 1 Siemens/cm to 200 Siemens/cm, 10 Siemens/cm to 150 Siemens/cm, 20 Siemens/cm to 100 Siemens/cm, 30 Siemens/cm to 60 Siemens/cm.

Ion conducting components assist in ion transport within one MOF crystal and between MOF crystals. Ions in MOF may provide a capacitive function in the battery system in order to provide relatively rapid charge release. Non-limiting examples of the ion conductive components include a carbon nanoparticle, such as a single-wall carbon nanotube, a multi-wall carbon nanotube, a Y-shaped carbon nanotube, a carbon nanoribbon, and/or a carbon microfiber. In certain instances, the ion conductive component includes a carbon structure, such as a graphene sheet. In certain other instances, the ion conductive component is an ion-exchanged ion conductive component.

Figure 4A:
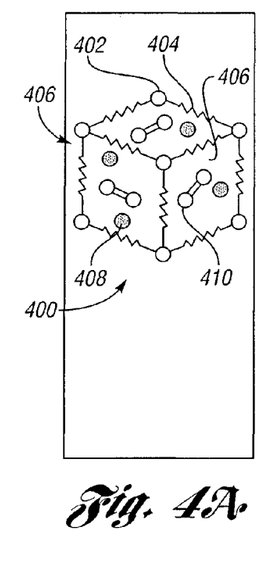
FIGS. 4A to 4J schematically illustrate embodiments of crystalline structures of metal organic frameworks.

Referring now to FIG. 4A, an MOF crystal is schematically illustrated. As depicted in FIG. 4A, an MOF of the structure M'@MOF having a gas-phase deposited metal (M') generally shown at 400 includes a metal atom with carboxylate oxygen 402 which is connected to a bridging ligand 404. Metal atom and bridging ligand 404 collectively define a cavity 406 into which gas-phase deposited metal 408 (M') and oxygen molecule 410 are situated. In at least one embodiment, the MOF 400 is an isorecticular MOF wherein all 12 bridging ligands 404 are identical to each other.

Figure 4B:
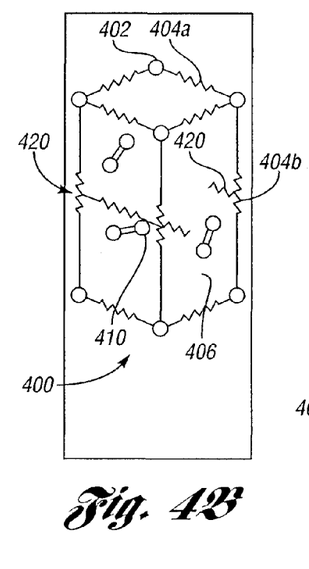

In another embodiment, as illustrated in FIG. 4B, an MOF with an electron conductive component 420 is schematically illustrated. Metal atom with carboxylate oxygen 402 is bridged by a first bridging ligand 404a and/or a second bridging ligand 404b. In certain instances, the second bridging ligand 404b is longer than the first bridging ligand 404a. The resulting MOF is heterorectricular. The metal atom 402 and bridging ligands 404a, 404b collectively define a cavity 406. Pendant from the second bridging ligand 404b is an electron conductive component 420. Non-limiting examples of a conductive component 420 include a polyacrylonitrile substituent and/or a cyano-substituent. It is appreciated that electronic conductive component 420 can be bonded to either first bridging ligand 404a and/or second bridging ligand 404b. Further, it is appreciated that not all bridging ligands need to have an electron conductive component. The electronically conductive groups 404a and 404b do not have to be pendent, in that they can be linker groups. It is yet further appreciated that electron conductive component 420 may be a different chemical species for one or more bridging ligand without exceeding the scope or spirit of the embodiment. Further included in MOF 400 is an oxygen molecule 410, which is optional, and may be present or absent depending upon the operating state in which the MOF is situated.

Figure 4C:
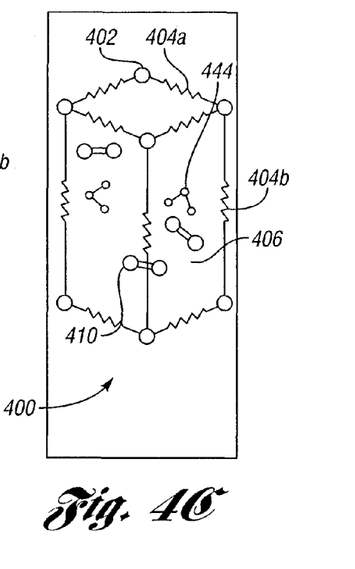

In yet another embodiment, as schematically illustrated in FIG. 4C, an MOF 400 with a guest molecule 444 is illustrated. MOF 400 includes metal atom 402 with bridging ligand 404a and 404b. The metal atom 402 and the ligands 404a, 404b collectively define a cavity 406. Situated inside the cavity 406 is one or more oxygen molecules 410 and one or more guest molecules 444. Non-limiting examples of the guest molecule 444 include solvents, solvents used to prepare the OSM, or electrolyte solvents. Non-limiting examples of the solvents for OSM synthesis include ethanol, dimethylformamide, diethylformamide, and tetrahydrofuran. It is appreciated that that while FIG. 4C shows only one or two guest molecules 444, in another embodiment a plurality of types of guest molecules could be contemplated without exceeding the scope or spirit of the embodiment.

Figure 4D:
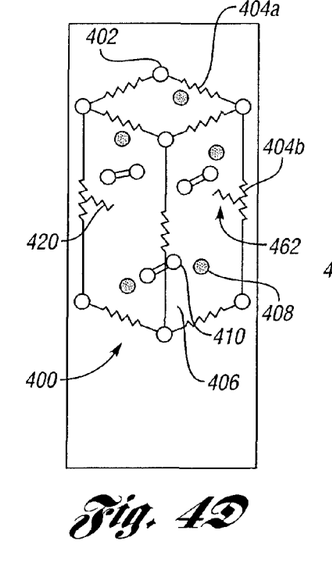

In yet another embodiment, as illustrated in FIG. 4D, an MOF generally shown at 400 includes deposited metal M' 408, an electron conductive component 420, and an ion conductive component 462 such as an organic carbonate. Metal atom 402 and the bridging ligands 404a, 404b collectively define a cavity 406. Received within the cavity 406 may be one or more electron conductive components 420, one or more ion conductive components 462, and/or one or more oxygen molecules 410.

Figure 4E:
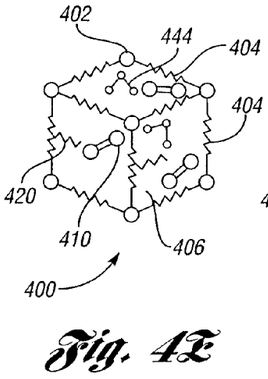

In yet another embodiment, as illustrated in FIG. 4E, an MOF 400 having one or more electron conductive components 420 and/or one or more guest molecules 444 is schematically illustrated. In this arrangement, metal atom with carboxylate oxygen 402 and bridging ligand 404 collectively define a cavity 406, into which one or more oxygen molecules 410 are received.

Figure 4F:
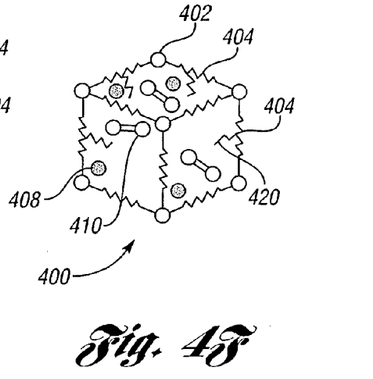

In another embodiment, as schematically illustrated in FIG. 4F, an MOF 400 is schematically illustrated. Metal atom 402 and bridging ligand 404 define a cavity 406. Received within the cavity 406 can be one or more gas-phase deposited metals M' 408, one or more electron conductive components 420, and/or one or more oxygen molecules 410.

Figure 4G:
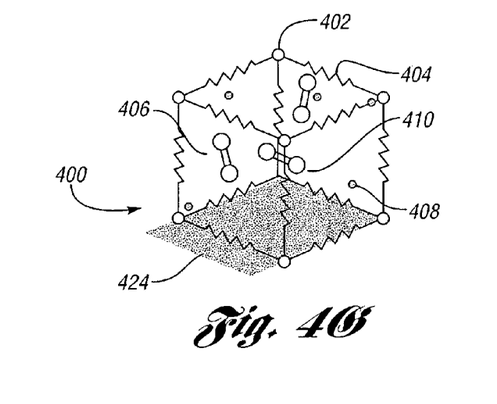

In yet another embodiment, as shown in FIG. 4G, an MOF 400 includes metal atoms 402 and bridging ligands 404, collectively defining a cavity 406. Received within the cavity 406 may be one or more gas-phased deposited metal M' 408, one or more ion conductive components 420, and/or one or more oxygen molecules 410. In certain instances, the MOF 400 may be disposed next to a graphite sheet 424 to be provided with additional electron conductivity.

Figure 4H:
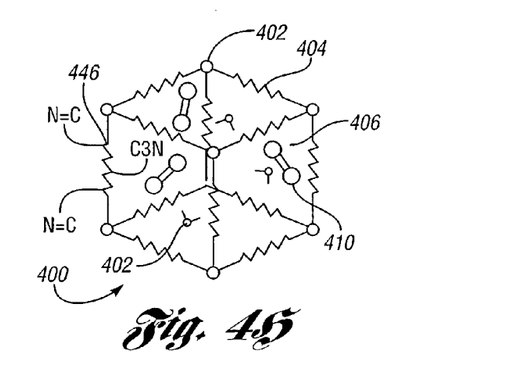

In yet another embodiment, as shown in FIG. 4H, an MOF 400 is schematically illustrated. The MOF 400 includes metal atoms 402 bridged with a first bridging ligand 404 and a second bridging ligand 446. The second bridging ligan 446 is cyano-substituted. Cyano-substituted bridging ligand 446 is electronically conductive and different in chain length from the first bridging ligand 404. This MOF is thus a heterorecticular MOF crystal. The metal atoms 402, the first bridging ligand 404 and the second cyano-substituted bridging ligand 446 collectively define a cavity 406. One or more oxygen molecules 410 can be received within the cavity 406.

Figure 4I:
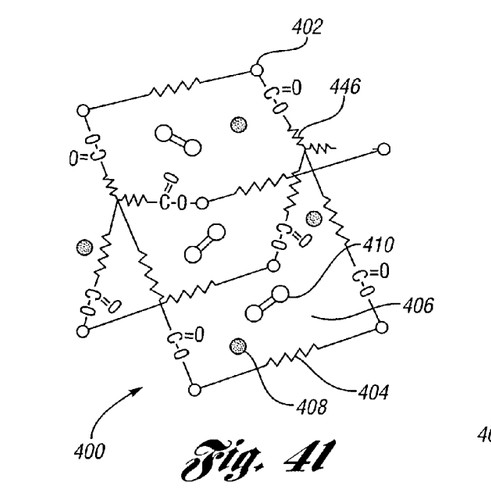

In another embodiment, as schematically illustrated in FIG. 4I, an MOF 400 includes metal atom 402 and multi-dentate ligand 446, which connects a plurality of metal atoms 402. The ligands 446 and the metal atoms 402 collectively define a cavity 406. Received within the cavity 406 may be one or more gas-phase deposited metals $M_1$ 408 and oxygen molecules 410.

Figure 4J:
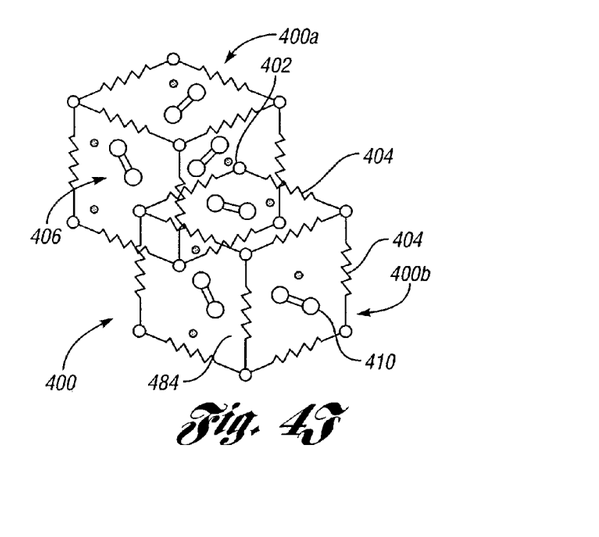

In another embodiment, as illustrated in FIG. 4J, an interpenetrating network of two MOFs 400a and 400b is generally illustrated at 400. In MOF 400a, metal atoms 402 and bridging ligands 404 define cavity 406 into which MOF 400b partially interpenetrates. The result is that MOF cavity 406 has a reduced volume for accepting oxygen molecules than would be otherwise expected based on the chain length of bridging ligand 404. Having interpenetrating MOFs may result in certain reduction of the absolute pore capacity, but the pore capacity and transfer of gas molecules between MOF crystals may be controlled by having interpenetrating MOFs.

In one or more embodiments, the MOF is a porous coordination network (PCN) having at least one entactic metal center (EMC), such as PCN-9 MOF. The EMC is an unusual geometry imposed by a ligand on a metal center in the MOF for the purpose of enhancing the MOF's affinity for oxygen. Non-limiting examples of imposed geometry include adapting organic positive electrode units to generate a pore comparable to the size of the oxygen molecule and introducing a coordinatively unsaturated metal center, such as a metal cation cluster. A combination of several EMCs may create a secondary building unit (SBU) within the MOF suitable for exceptional gas sorption affinity as determined by adsorption isotherms collected at various temperatures and fitted using the Langmuir-Fruendlich equation.

When applied as an example of the OSM, and in certain instances, PCN-9 may be provided with an oxygen adsorption enthalpy greater than 12 kJ/mol.$O_2$, ranging from 15 kJ/mol.$O_2$ to 45 kJ/mol.$O_2$, from 17 kJ/mol.$O_2$ to 43 kJ/mol.$O_2$, or 18 kJ/mol.$O_2$ to 23 kJ/mol.$O_2$. PCN-9 has a fixed pore diameter ranging from 0.55 nm to 0.75 nm or 0.6 nm to 0.7 nm.

In certain instances, the MOF includes a solvated MOF formed from 1,4-benzenedicarboxylic acid (BDC) with a zinc metal cation cluster. A non-limiting example of the solvated MOF is $Zn_4$ (μ-4O)(μ-BDC)$_3$.(DEF)$_7$, where DEF is diethylformamide, a solvent molecule.

An example of a manufacturing process for certain MOFs, such as the MOF-5, includes the steps of mixing a solution of terephthalic acid with a zinc salt, such as zinc nitrate to form a mixture. The mixture is crystallized or precipitated at a temperature ranging from 25° C. to 200° C. The precipitate is filtered from the solution and dried. It is appreciated that MOFs may be modified after synthesis via reactions such as oxidation, acetylization, hydrogenation, Knoevenagel condensation, and/or Heck coupling. Moreover, the MOFs may be activated by removing the solvent introduced during a crystallization and/or precipitation process.

In one or more embodiments, the second electrode 104b, which functions as an anode during discharging, includes a metal material (M). The metal material M may include a metal, such as an alkali metal, an alkaline-earth metal, or a transition metal. The metal material M may also include alloys of such metals, metal ceramics, superalloys, fusible alloys, metal intercalation compounds or materials, and amalgams. In certain particular instances, the metal material M includes an elemental monolith negative electrode, including, for example, Li or Na; a mixed material negative electrode, having an intercalation compound, such as graphite; and/or an alloy, such as a lithium-silicon alloy, a lithium aluminum alloy, and/or a lithium boron alloy.

In certain particular instances, the second electrode 104b is formed of elemental lithium metal. In certain other particular instances, the second electrode 104b includes an alloy of lithium.

The following applications disclose and claim battery systems that may be related to the battery system disclosed and claimed in the following applications filed on Jul. 1, 2010: U.S. patent application Ser. No. 12/828,380 (now U.S. Pat. No. 8,968,942 issued on Mar. 3, 2015), Ser. No. 12/828,399 (now abandoned), Ser. No. 12/828,386 (now U.S. Pat. No. 8,658,319 issued on Feb. 25, 2014), Ser. No. 12/828,752 (now U.S. Pat. No. 8,119,295 issued on Feb. 21, 2012), and Ser. No. 12/828,396 (now U.S. Pat. No. 9,147,920 issued on Sep. 29, 2015). Each of the identified applications is incorporated herein by reference in their entirety.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
storing oxygen in a cathode including an oxygen storage metal-organic framework ("MOP") material comprising a mixture of ionic conductive material, electron conductive material and catalyst material within the MOF.

2. The method of claim 1, wherein the MOF is an organically solvated MOF.

3. The method of claim 1, wherein the ion conductive material is an electrolyte.

4. The method of claim 1, wherein the ion conductive material is a carbon nanoparticle material.

5. The method of claim 1, wherein the mixture is a homogeneous mixture.

6. The method of claim 1, wherein the catalyst material is $Fe_2O_3$ or $CO_3O_4$.

7. The method of claim 1, wherein the MOF is a crystalline MOF.

8. A method comprising:
releasing oxygen from a cathode including an oxygen storage metal-organic framework ("MOP") material comprising a mixture of ionic conductive material, electron conductive material and catalyst material within the MOF.

9. The method of claim 8, wherein the ion conductive material is an electrolyte.

10. The method of claim 8, wherein the ion conductive material is a carbon nanoparticle material.

11. The method of claim 8, wherein the mixture is a homogeneous mixture.

12. The method of claim 8, wherein the catalyst material is $Fe_2O_3$ or $CO_3O_4$.

13. The method of claim 8, wherein the MOF is an organically solvated MOF.

14. The method of claim 8, wherein the MOF is a crystalline MOF.

15. A method comprising:
storing oxygen in a cathode including an oxygen storage metal-organic framework ("MOP") material comprising a mixture of ionic conductive material, electron conductive material and a composition of M'@MOF, where M' is a catalyst material and includes one or more metal-containing molecules and MOF is a metal organic framework.

16. The method of claim 15, wherein the ion conductive material is an electrolyte.

17. The method of claim 15, wherein the ion conductive material is a carbon nanoparticle material.

18. The method of claim 15, wherein the mixture is a homogeneous mixture.

19. The method of claim 15, wherein the catalyst material is $Fe_2O_3$ or $CO_3O_4$.

20. The method of claim 15, wherein the MOF is an organically solvated MOF.

* * * * *